No. 868,818. PATENTED OCT. 22, 1907.
T. T. SMITH.
TIRE TIGHTENER.
APPLICATION FILED APR. 20, 1907.
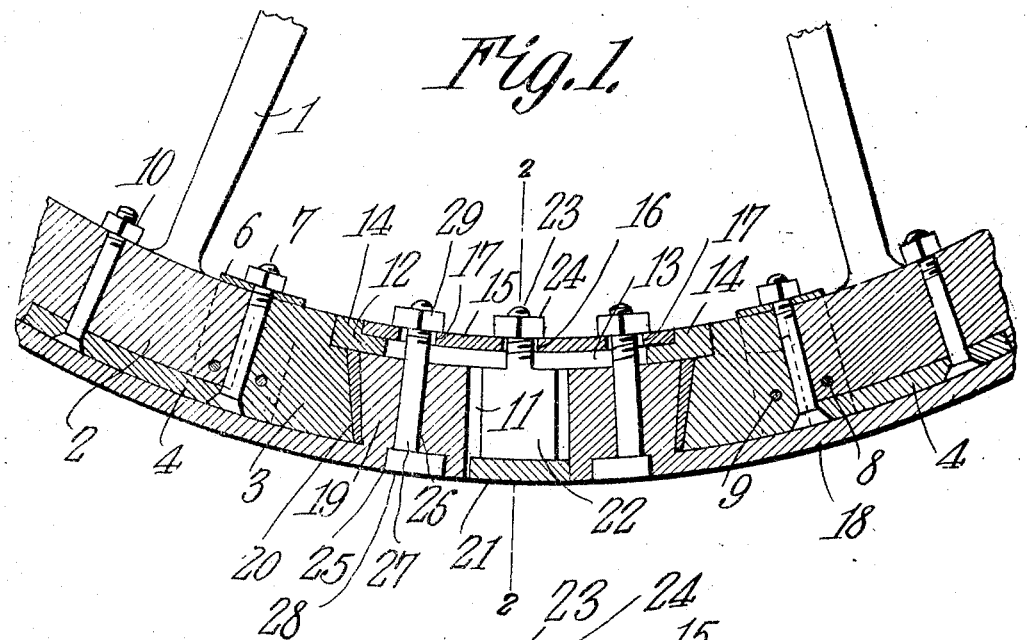
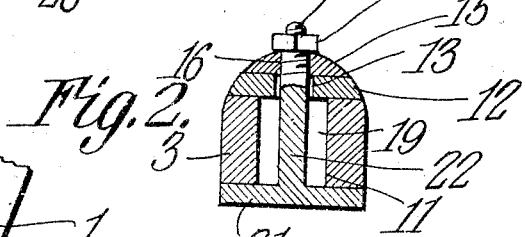
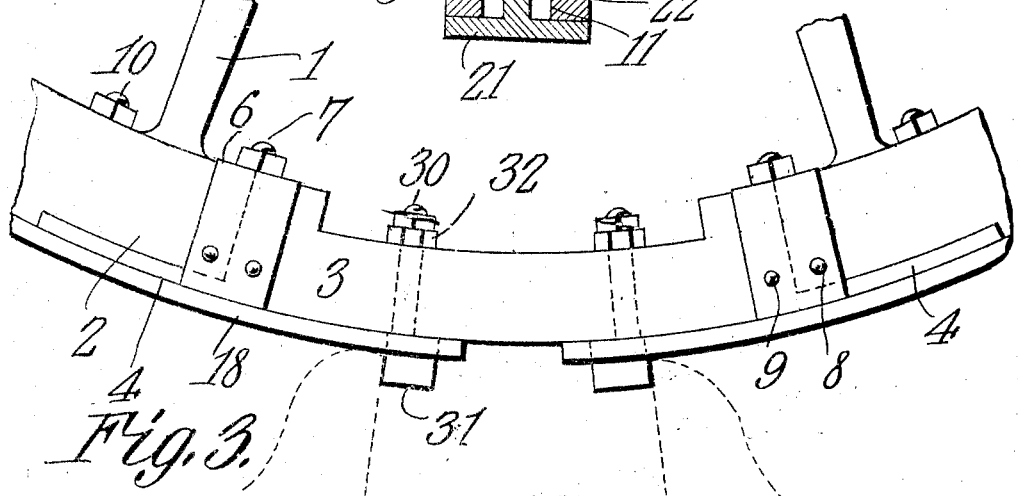
WITNESSES:
Thomas T. Smith,
INVENTOR.
By ATTORNEYS

UNITED STATES PATENT OFFICE.

THOMAS T. SMITH, OF LEE, IOWA.

TIRE-TIGHTENER.

No. 868,818.  Specification of Letters Patent.  Patented Oct. 22, 1907.

Application filed April 20, 1907. Serial No. 369,367.

*To all whom it may concern:*

Be it known that I, THOMAS T. SMITH, a citizen of the United States, residing at Lee, in the county of Ringgold and State of Iowa, have invented a new and useful Tire-Tightener, of which the following is a specification.

This invention has relation to tire tighteners and it consists in the novel construction and arrangement of its parts as hereinafter shown and described.

The object of the invention is to provide a means permanently connected with a wheel whereby the tire thereof may be tightened at will, the said means consisting primarily of a felly section inserted in alinement with the wheel felly, said section being formed from metal and having at its ends ledges which overlap the ends of the adjacent felly. Securing means is provided for positively retaining the felly section in proper relation to the felly. The said felly section is provided with an elongated opening lying in alinement with the plane of the wheel. The tire used upon the wheel is not continuous and is provided at its ends with blocks which enter the opening of the felly section. Wedges are adapted to be interposed between the ends of the opening in the felly section and the sides of the said block and a splice piece is interposed between the ends of the said tire. A cradle rests upon the inner end of the felly section and is provided with an elongated opening. A cap rests in a depression formed at the inner side of the cradle and securing bolts for the ends of the tire pass through the felly section, the cradle, and the cap. A similar bolt is also provided for the splice piece.

In the accompanying drawing:—Figure 1 is a longitudinal sectional view of a portion of the wheel rim showing the tire tightener. Fig. 2 is a transverse sectional view of the same cut on the line 2—2 of Fig. 1, and Fig. 3 is a side elevation of the same illustrating the manner of tightening the tire.

The wheel 1 is provided with the usual felly 2 in which is inserted the felly section 3. Said felly section is in the form of a block having at its ends the ledges 4 which are countersunk in the outer portions of the ends of the felly 2. The bands 6 overlap the joints between the felly 2 and the felly section 3. Said bands are retained by the bolts 7 which pass radially, with relation to the wheel, through the said bands, the felly 2 and felly section 3 and also by the transverse bolts 8 and 9 which extend transversely through the ends of the band and the felly 2 and felly sections 3, respectively. The radially disposed bolts 10 also pass through the felly 2 and the ledges 4. By this arrangement the felly section 3 is securely retained in proper position with relation to the felly 2. The felly section 3 is provided with the elongated opening 11 which is disposed longitudinally thereof and lies substantially in the same plane as that of the wheel 1. The cradle 12 fits between the ends of the felly 2 and rests upon the inner surface of the felly section 3 and over the opening 11 thereof. Said cradle is provided with an opening 13 which is also elongated and registers with the opening 11. The ends of the cradle 12 are elevated as at 14 and the cap 15 rests in the depression occurring between the said elevated ends 14. Said cap is provided at its middle with an opening 16 and in its end portion with the slightly elongated perforations 17.

The tire 18 is not continuous and is provided at its end with the blocks 19 which enter the opening 11 of the felly section 3. The wedges 20 are interposed between the ends of the opening 11 and the sides of the blocks 19. The splice piece 21 is interposed between the ends of the tire 18 and rests against the outer side of the felly section 3. The said splice piece is provided with a shank 22 which is of greater breadth than thickness and which lies in the opening 11 of the felly section 3. The shank 22 is provided with a screw threaded extremity 23 which passes through the perforation 16 of the cap 15 and upon which is screwed the nut 24. The tire ends are provided with the rectangular openings 25 which register with the perforations 26 passing through the blocks 19. The rectangular openings 25 are of greater lateral dimensions than the perforations 26. The bolts 27 are provided with the squared heads 28 which lie in the rectangular openings 25 of the tire ends and the body portions of the said bolts pass through the perforations 26 of the blocks 19 and through the opening 13 of the cradle 12 and also through the slightly elongated perforations 17 in the cap 15. The extremities of the bolts 27 are screw threaded and the nuts 29 are screwed upon the threaded ends of the said bolts and bear against the inner surface of the cap 15.

To tighten the tire upon the wheel thus equipped the bolts 27, splice piece 21, cradle 12 and cap 15 are removed. The bolts, such as 30, having elongated heads 31 are substituted in the perforations at the ends of the tire for the bolts 27 just removed and the nuts 32 are screwed down upon the bolts 30 until they come into engagement with the inner ends of the blocks 19. The bolt heads 31 are then placed between the jaws of a vise (not shown) and the vise is tightened up. Thus, the ends of the tire are brought together about the rim of the wheel, or as near together as the slack in the tire will permit. Wedges 20 are then inserted between the ends of the opening 11 and the sides of the blocks 19. The said wedges should occupy the entire space occurring between the said parts in the newly adjusted positions. The bolts 30 are then removed and the bolts 27, together with the cradle, and the cap 15 are placed upon the felly section 3 as above described. The splice piece 21, after having been reduced in breadth by any suitable means in order to fit between the ends of the tire 18 in their newly adjusted positions, is then inserted between the said tire ends and the nut 24 is screwed down upon the shank thereof. Thus the tire is tightened and the parts are reassembled. The above operation may be repeated as often as the tire becomes loosened. Each time, however, wedges 20 of greater thickness than their predecessors must be employed and the splice piece 21 must be reduced in breadth at each operation.

Having described my invention what I claim as new and desire to secure by Letters Patent is:—

1. In a wheel, a felly section interposed between the ends of the felly thereof and having an elongated opening, a non-continuous tire having at its ends blocks which enter the opening of the felly section, a cradle located upon the felly section and having an opening registering with the elongated opening thereof, a cap resting upon the cradle, bolts passing through the ends of the tire and through the cradle and cap, nuts screw threaded upon said bolts and a splice piece interposed between the ends of the tire and having a shank provided with a threaded extremity which passes through the cap and a nut engaging said extremity.

2. In a wheel, a felly section interposed between the ends of the felly thereof and having an elongated opening, a non-continuous tire having at its ends blocks which enter the opening in the felly section, the tire ends having non-circular openings and the blocks having perforations which register with said openings, a cradle also interposed between the ends of the felly and resting upon the felly section and having an elongated opening which registers with the opening in the felly section, said cradle having elevated ends, a cap resting upon the cradle between the elevated ends thereof, bolts having non-circular heads which lie in the openings in the tire ends, said bolts passing through said blocks, the cradle, and the cap and having suitable securing means and a splice piece carried by the felly section and interposed between the ends of the tire.

3. In a wheel, a felly section interposed between the ends of the felly thereof and having ledges which overlap the ends of the felly, the felly being provided with extremities which overlap the ends of the felly section, bands overlapping the intermediate portion of the joints between the felly section and felly, a non-continuous tire resting upon the felly, means for securing the ends of the tire to the felly section and a splice piece carried by the felly section and interposed between the ends of the tire.

In testimony that I claim the foregoing as my own, I have hereto affixed my signature in the presence of two witnesses.

THOMAS T. SMITH.

Witnesses:
LEWIS E. CASADY,
A BERT A. CASADY.